Aug. 5, 1958  H. W. JEWELL  2,846,243
PIPE COUPLING INCLUDING ELASTOMERIC COVERED CLAMPING MEANS
Filed Aug. 28, 1953  2 Sheets-Sheet 1
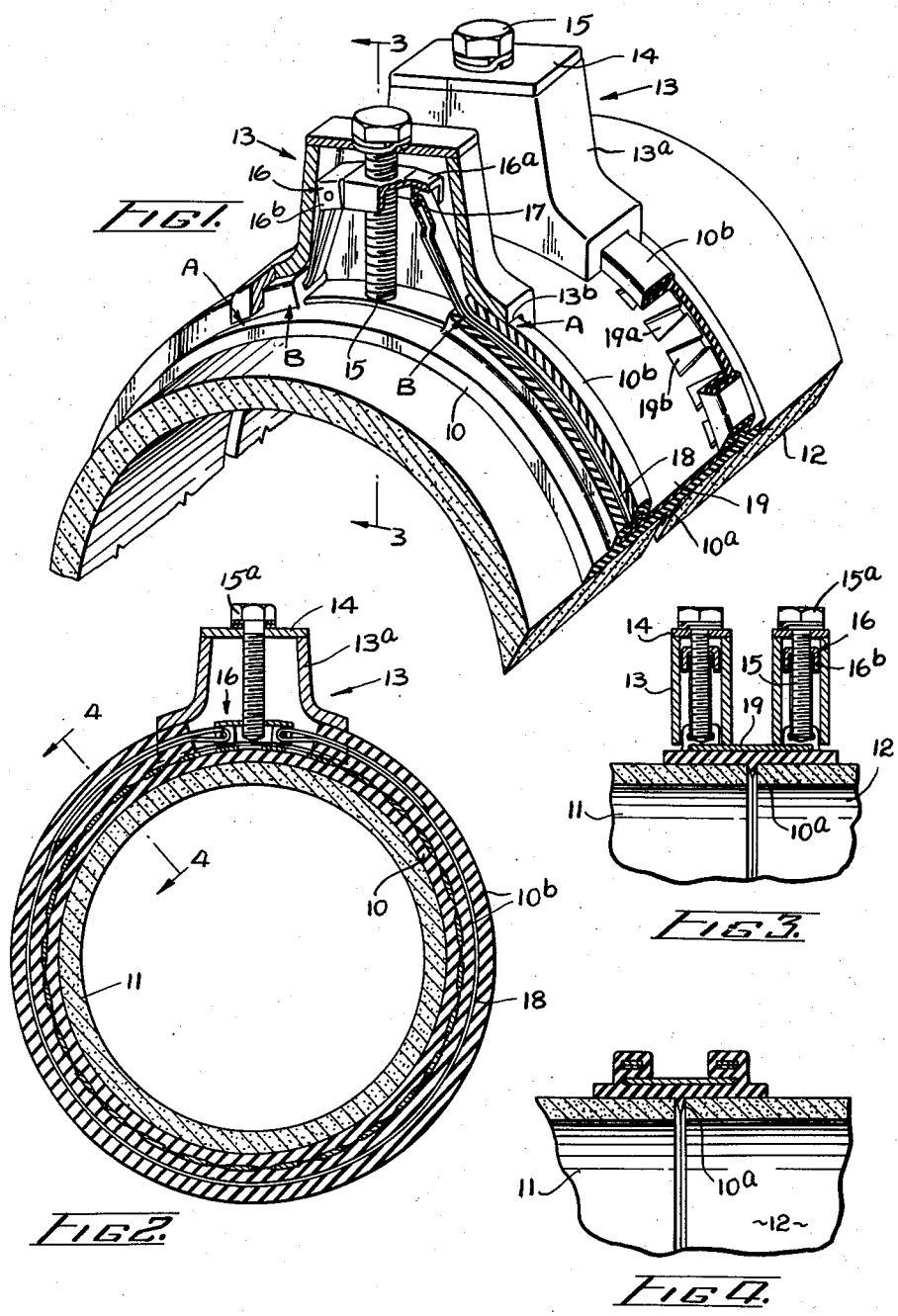
INVENTOR
HOWARD W. JEWELL
BY
Maybee & Legris
ATTORNEYS.

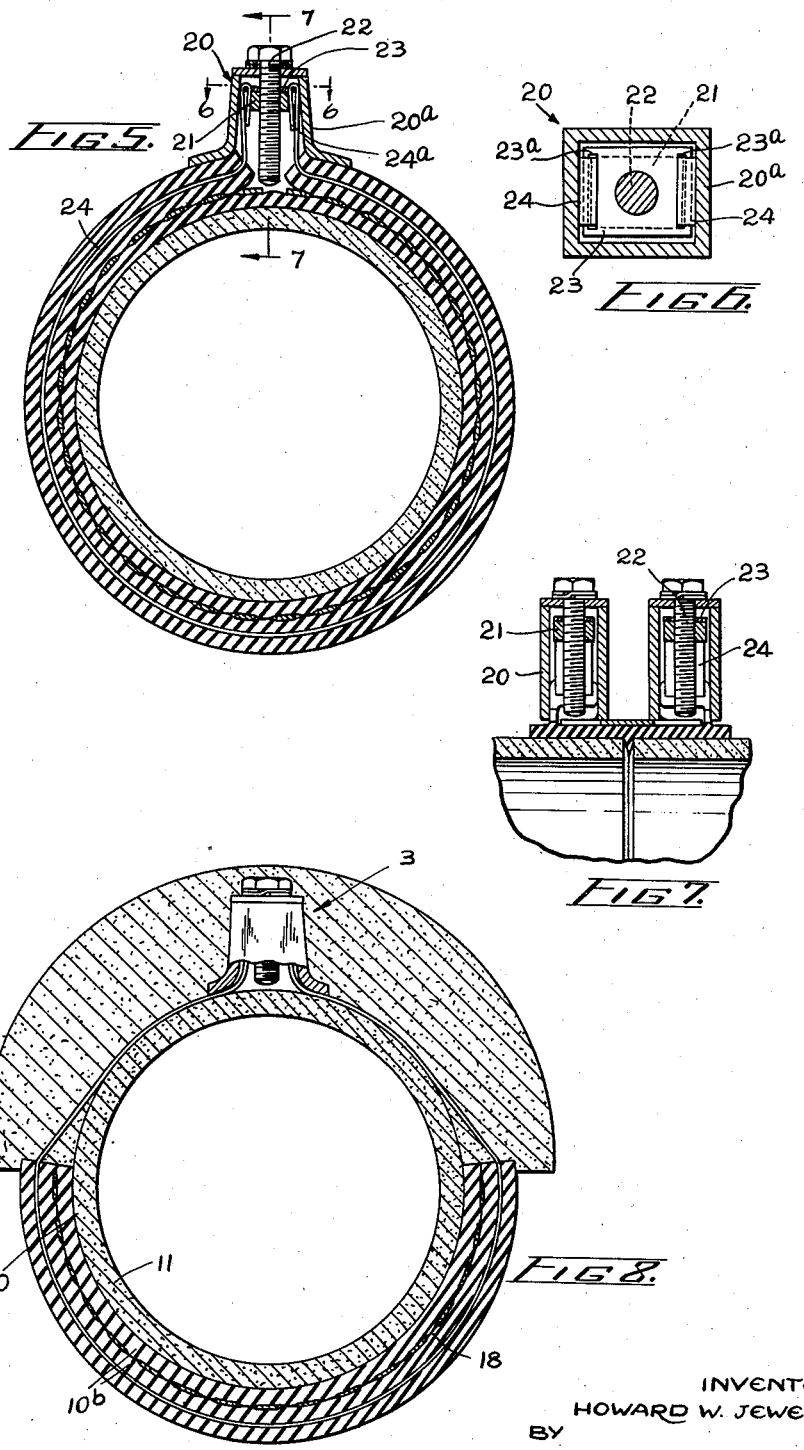

United States Patent Office 2,846,243
Patented Aug. 5, 1958

2,846,243

PIPE COUPLING INCLUDING ELASTOMERIC COVERED CLAMPING MEANS

Howard W. Jewell, Islington, Ontario, Canada

Application August 28, 1953, Serial No. 377,150

6 Claims. (Cl. 285—369)

This invention relates to pipe couplings which are adapted for use with ceramic pipe having plain ends.

Particularly for use with ceramic pipe, it is important to provide pipe couplings that will positively and uniformly grip the adjacent ends of the pipe and that will be somewhat resilient so as to dispense with any necessity for absolute registration of the ends. United States Patent No. 2,530,700, issued November 21, 1950, discloses one useful form of pipe coupling which meets the ideal requirements for ceramic pipe use. This invention is intended to furnish certain improvements over the construction disclosed in that prior patent so as to achieve the same objects more advantageously where the prior patent requires that the whole of an annular channel surrounding the joint be filled with a sealing material such as cement, this invention provides a construction in which only the small space surrounding the tightening means needs to be sealed, and it also provides other advantages over the earlier construction, as follows from the improved construction to be described.

In the accompanying drawings, in which each reference character denotes the same part in all the views:

Fig. 1 is a perspective view of a coupling according to the invention assembled over the joint between adjacent ends of two ceramic pipe sections, Fig. 2 is a cross-section of the coupling, Fig. 3 is a section on the line 3—3 in Fig. 1, Fig. 4 is a cross-section on the line 4—4 in Fig. 2, Fig. 5 is a cross-sectional view like that in Fig. 2 showing a modified form of the housing of the invention, Fig. 6 is a section on the line 6—6 in Fig. 5, Fig. 7 is a section on the line 7—7 in Fig. 5, and Fig. 8 is another cross-sectional view like that in Figs. 2 and 5 showing another modified form of the invention.

Referring to Figs. 1 to 4 of the drawings, the principal structural element of the coupling according to the invention is a resilient belt 10 adapted to overlie the circumferential surfaces of the pipe sections 11 and 12 and, in the main form of the invention, completely encircling the joint between the pipe sections. It preferably has a particular cross-sectional form, as shown in the drawings (see Figs. 1 and 4), characterised by the illustrated arrangement of a central inwardly extending annular flange 10a, forming a stop ring for the pipe ends, and parallel raised passages in the material of the belt provided by hollow ridges 10b each encircling the belt 10 near one of its side edges. The ridges provide passages within the belt, each ridge being a tubular annulus of rectangular cross-section having one of its side faces—the one nearer the edge of the belt 10—extended inwardly and integrally connected to the remainder of the belt so that the radially inner surfaces of the hollow ridges 10b are held a short distance away from the main portion of the outer surface of the belt 10. The ridges 10b may be made separate from the belt 10 if desirable. The belt 10 is formed of a resilient compressible material such as a rubber or synthetic rubber composition; it has the advantage that it is adapted for manufacture by extrusion of such compositions from a suitable die.

A short portion of each of the hollow ridges 10b is cut away at the same angular location on the belt 10, and over the gaps provided by the cut away portions of the ridges, housings 13, preferably of cast metal, are disposed. If the belt does not completely encircle the pipe joint, the housings may be disposed on the pipe between the belt ends. Each of the housings 13 is the same as the other and has parallel side walls joined by downwardly and outwardly sloping end walls 13a. The side walls are spaced apart by the width of each of the ridges 10b and the end walls in effect terminate above the bottom of the side walls to provide at each end an inverted notch 13b which receives one of the cut ends of the ridge 10b. The notches 13b should not, at the outer ends of the housing, be deeper than the normal height of the ridges 10b, so that the outer ends of the housings, when they are seated on the belt, will hold the ridges in place, and the notches will engage the resiliently compressible material of the belt. The depth of the notches may increase inwardly to provide smoothly curved lower surfaces blending with the inner surfaces of the end walls 13a. A housing cover, provided by a flat plate 14 having a central opening, closes the open top of the housing 13 and a bolt or stud 15 having a head 15a extends into the housing through the central opening. Threaded on the stud 15 is a supporting bridge 16 which is raised or lowered within the housing by turning the stud 15; the bridge 16 may be fabricated from a blank of sheet metal by providing a central web 16a having a threaded hole for the stud 15 and two pairs of apertured flanges 16b bent downward so that each pair presents aligned holes to support a rod 17 at one end of the bridge.

A thin and relatively narrow band 18 of sheet metal is passed through each of the hollow ridges 10b so as to extend completely around the belt 10 from one of the rods 17 in the respective housing to the other rod 17 at the opposite end of the bridge 16 and pass between the belt and the walls of the housing, that is, in the general sense, between the pipe surfaces and the walls of the housing; each end of the band is bent upon itself to form a loop passing over the rod 17, and the short end of the loop extends back into the channel in the hollow ridge 10b at the respective end of the ridge to secure it. If the ridges 10b are separate from the belt they may be formed directly on the bands 18 to provide assembled units for application to the belt 10. The length of the band 18 from one rod 17 to the other on the same bridge is such that when the bridge is at the bottom of the stud 15 the band extends through the channel in the ridge 10 without being under tension and even providing a little slack to accommodate stretching of the belt 10 if desired. The band can then be placed under what ever tension is required by turning the stud 15 to raise the bridge toward the head of the stud, thus causing the circumference of the belt 10 to contract; the other side of the belt can be correspondingly tightened by applying tension to the other band 18 in a similar way. Some difference in size, as well as lack of axial registration, between the two pipes joined, may be allowed for by this arrangement, and pipes of widely differing sizes may be joined if the belt 10 is suitably stepped so as to be larger on one side of the flange 10a than on the other.

The length and configuration of the housings 13 (and the corresponding arc length of the cut-away of the ridges 10b) should be such that the points of tangency B of the band 18 with the belt 10 (where the band starts to bend away from the belt to engage the rod 17) are between the stud 15 and two main bearing points A where the outer ends of the housings engage the ridges 10b and prevent them from being pulled away from the belt or pipe, this enables the housing to be properly sealed on the belt as the bands 18 are tightened.

A suitable sealing composition, such as sulphur-silica cement, hydraulic or Portland cement, or a resinous cementing composition, is inserted into the housings 13 before the bands 18 are tightened. The plates 14 can be pivoted on the studs 15 to allow insertion of the sealing material on location, or a sealing composition of the non-setting plastic type may be inserted when the couplings are manufactured.

The belt 10 may be given a greater degree of rigidity by means of a stiffening membrane, band or web 19 overlaying the belt 10 between the ridges 10b. Since the rigidly inner surfaces of the hollow ridges are in the preferred construction held a short distance away from the outer surface of the belt by the extended portions of the outer side faces of the space is provided under each of the ridges and the outer edges of the web 18 extend under each of the ridges between it and the belt 10 into this space. If the ridges 10b are separate, they are directly applied over the edges of the web 19. The edges of the web are preferably notched as best shown in Fig. 1: the notches 19a taper from a wide base 19b to a narrow mouth at the edge of the web. The effect of this conformation of the notches is to receive and hold against axial displacement the added thickness which compensates for its contraction in length when the bands 18 are tightened; the web 19 therefore serves not only to stiffen the belt 10 but also to restrain axial deformation of it. The web 19 may be composed of any rigid material such as metal, fibre, fibreglass, waterproof paper or plastic; for instance it may be made of stainless steel, and in this case as in others, a protective lining of kraft paper or similar thin flexible material may be disposed under the web 19.

The form of the invention illustrated in Figs. 5 to 7 differs from that already described in that it employs a smaller, more compact housing; the housing 20 contains a nut 21 threaded on a stud 22; a flat bridge 23 of steel material, almost as long as the inner length of the housing, surmounts the nut and receives the ends of sheet metal bands 24 in slots 23a provided in the bridge. The bands 24 differ from the bands 18 in Figs. 1 to 4 only in that the free ends 24a are bent back and held in place by virtue of the fact that the clearance between the side walls of the nut 21 and the end walls 20a of the housing is kept so small that the bent-over free ends of the bands 24 engage the nut and are prevented from straightening out under the tension set up when the bands are tightened by turning the stud 22 to move the nut 21 upward; the attachment of the bands 24 to the bridge is made secure by arranging the end walls 20a of the housing to slant toward each other from base to top, thus coming into contact with the bands 24 and forcing them against the ends of the bridges 23 as the nut rises and the tension in the bands is increased.

The belt 10 as previously indicated need not completely surround the pipe sections; if it does not, other means for sealing the exposed length of the joint between the pipe sections may be used. As shown in Fig. 8, a half-belt 25 with ridges 25b, enclosing bands 18 as in the previously-described forms of the invention, may be provided to extend from the ends of the ridges 25b and extend over the bare upper portion of the pipes to the housings 13 as previously described and disposed on the top of the pipe. As before, the end portions of the bands extend beneath the walls of the housings 13, that is, between the pipe surfaces and the housing walls. This construction is supplemented by the use of a structural cover 26 of concrete over the full length of the upper half of the pipe; this provides the upper portion of the coupling seal. The pipe is laid on the bottom of the trench (which may be stabilized if necessary in a conventional manner with small rock or concrete), and after the half-couplings are secured, a back fill of earth 27 is placed on each side of the pipe up to its "springing line" at one-half the height; the concrete cover 26 is then poured over the pipe and preferably given an arch-shaped section at the top to reduce the volume of concrete required. The half-couplings seal the joints below the concrete cover, while the concrete seals the remaining parts of the joints and transmits the pressure of the fill to the upper half of the pipe in a manner which provides an efficient restraint against springing strain.

The half-belt 25 may also be disposed over the top half of the pipe for use with a conventional concrete "mattress" covering the lower half of the pipe, but this arrangement sacrifices the more efficient structural support derived from the concrete cover 26.

It is to be understood that the form of the invention herewith shown and described, is to be taken as a preferred example of the same, and that various changes in the shape, size and arrangement of the parts may be resorted to without departing from the spirit of the invention or the scope of the subjoined claims.

What I claim as my invention is:

1. A coupling for the joint between adjacent ends of two sections of pipe in end-to-end abutment, comprising a belt of resiliently compressible material encircling the circumferential surfaces of the adjacent pipe ends, a housing for each band on the outer surface of the belt and having walls including end walls extending outwardly from the belt and having a cover, passages within the belt for substantially all of its annular length, one over each pipe end, the passages opening into the housings, a clamping band extending through each of the passages whereby the bands extend under the end walls of the housings within the passages and project through the openings into the housings, a threaded member connected to each of the housings, the threaded members engaging the ends of the bands inside the housing and being rotatable to draw the ends of the bands away from the belt within the housings and thereby both tighten the bands on the belt and draw the housings inwardly so that the end walls of the housings will be seated on resiliently compressible material and will force the material of the belt against the bands in the passages, the housings providing with the belt a complete enclosure adapted to receive a sealing composition to surround the threaded members and the ends of the bands.

2. A coupling for the joint between adjacent ends of two sections of pipe in end-to-end abutment, comprising a belt of resiliently compressible material encircling the circumferential surfaces of the adjacent pipe ends, a housing for each band on the outer surface of the belt and having walls including end walls extending outwardly from the belt, passages within the belt for substantially all of its annular length, one over each pipe end, each of the passages opening into one of the housings, a clamping band extending through each of the passages whereby the bands extend under the end walls of the housings within the passages and project through the openings into the housings, tightening means in each of the housings connecting the ends of the band inside the housings, the tightening means being adapted to tighten the bands on the belt and draw the housings inwardly so that the end walls of the housing will be seated on the resiliently compressible material of the belt and will force the said material against the bands in the passages.

3. A coupling for the joint between adjacent ends of two sections of pipe in end-to-end abutment, comprising a belt of resiliently compressible material encircling the circumferential surfaces of the adjacent pipe ends, a housing for each band on the outer surface of the belt and having walls including end walls extending outwardly from the belt and having a cover, passages within the belt for substantially all of its annular length, one over each pipe end, each of the passages opening into one of the housings, a metal clamping band extending through each of the passages whereby the bands extend under the end walls of the housings within the passages and project through the openings into the housings, the lower edges of the end walls being notched to provide spaces for the band and the overlying and underlying material of the belt under the said end walls, a threaded member connected to each of the housings, the threaded members engaging the ends of the bands inside the housing and being rotatable to draw the ends of the bands away from the belt within the housings and thereby both tighten the bands on the belt and draw the housings inwardly so that the notches in the end walls of the housings will engage the resiliently compressible material and the end walls will force the material of the belt against the bands in the passages, the housings providing with the belt a complete enclosure adapted to receive a sealing composition to surround the threaded members and the ends of the bands.

4. A coupling for the joint between adjacent ends of two sections of pipe in end-to-end abutment, comprising a belt of resiliently compressible material encircling the circumferential surfaces of the adjacent pipe ends, two parallel hollow ridges of resiliently compressible material spaced apart on the belt and providing enclosed passages for substantially all the annular length of the belt, the ridges being spaced radially from the belt for a part of their width near their inner, mutually facing edges and being connected to the belt by wells extending from the ridges to the belt, a stiffening web extending into the spaces between the ridges and the belt and overlying the flat surface of the belt between the said walls of the ridges, a housing disposed on the outer surface of the web over each of the ridges and having walls extending outwardly from the web, the passages in the ridges opening into the housings, a clamping band extending through each passage whereby it extends under the end walls of the housing within the passage and project into the housing, tightening means in each of the housings connecting the ends of the band inside the housing, the tightening means being adapted to tighten the bands on the belt and draw the housings inwardly so that the end walls of the housing will be seated on resiliently compressible material and will force the material of the belt against the bands in the passages.

5. A coupling as claimed in claim 4 in which the web has notches formed in its outer edges, the width of the notches in the circumferential direction of the web being greater at their inner than at their outer ends.

6. A coupling for the joint between adjacent ends of two sections of pipe in end-to-end abutment, comprising a belt of resiliently compressible material encircling the circumferential surfaces of the adjacent pipe ends, two parallel hollow ridges integral with and spaced apart on the belt and providing passages within the material of the belt for substantially all its annular length, each of the ridges being disposed near one of the outer edges of the belt, the ridges being spaced radially from the belt for a part of their width inward of their inner, mutually facing edges and being connected to the belt by walls joining the outer edges of the ridges to the belt, a stiffening web extending into the spaces between the ridges and the belt and overlying the flat surface of the belt between the said walls on the ridges, a housing disposed on the outer surface of the web over each of the ridges and having walls including end walls extending outwardly from the web, the passages in the ridges opening into the housings, a clamping band extending through each passage whereby it extends under the end walls of the housing within the passage and projects into the housing, the end walls being notched to provide spaces for the ridges under the end walls, tightening means in each of the housings connecting the ends of the band inside the housing, the tightening means being adapted to tighten the bands on the belt and draw the housings inwardly so that the notches in the end walls of the housings will engage the resiliently compressible material and the end walls will force the material of the belt against the bands in the passages.

References Cited in the file of this patent

UNITED STATES PATENTS

| | | |
|---|---|---|
| 607,018 | Connelly | July 12, 1898 |
| 780,843 | Wallace | Jan. 24, 1905 |
| 913,588 | Vibber | Feb. 23, 1909 |
| 1,412,189 | Lopdell | Apr. 11, 1922 |
| 1,787,971 | Clarke | Jan. 6, 1931 |
| 2,180,810 | Keegan | Nov. 21, 1939 |
| 2,273,398 | Couty | Feb. 17, 1942 |
| 2,530,700 | Jewell | Nov. 21, 1950 |

FOREIGN PATENTS

| | | |
|---|---|---|
| 234,639 | Switzerland | Oct. 15, 1944 |